United States Patent
Woo (10) Patent No.: US 7,919,885 B2
(45) Date of Patent: Apr. 5, 2011

(54) METHOD OF CONTROLLING BATTERY POWER, POWER CONTROL APPARATUS, AND PORTABLE DEVICE USING THE SAME

(75) Inventor: Jae Ho Woo, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 12/168,605

(22) Filed: Jul. 7, 2008

(65) Prior Publication Data
US 2009/0051223 A1 Feb. 26, 2009

(30) Foreign Application Priority Data
Aug. 24, 2007 (KR) .................. 10-2007-0085435

(51) Int. Cl.
*H02J 3/00* (2006.01)
*H02J 7/00* (2006.01)
(52) U.S. Cl. .......................................... 307/80; 320/116
(58) Field of Classification Search .................. 307/80; 320/116
See application file for complete search history.

(56) References Cited

U.S. PATENT DOCUMENTS

| 5,549,984 | A | * | 8/1996 | Dougherty | 429/61 |
| 5,666,006 | A | * | 9/1997 | Townsley et al. | 307/66 |
| 5,684,384 | A | | 11/1997 | Barkat et al. | |
| 5,739,596 | A | * | 4/1998 | Takizawa et al. | 307/66 |
| 5,959,368 | A | * | 9/1999 | Kubo et al. | 307/18 |
| 6,081,096 | A | | 6/2000 | Barkat et al. | |
| 6,452,362 | B1 | * | 9/2002 | Choo | 320/116 |
| 6,879,134 | B2 | | 4/2005 | Stanesti et al. | |

FOREIGN PATENT DOCUMENTS

| CN | 1150712 A | 5/1997 |
| CN | 2663203 Y | 12/2004 |
| CN | 1578045 A | 2/2005 |

* cited by examiner

*Primary Examiner* — Michael Rutland Wallis
(74) *Attorney, Agent, or Firm* — Jefferson IP Law, LLP (57) ABSTRACT

A method for controlling batteries, a power control apparatus, and a portable device using the same are provided. Based on a connection status of a main battery and an auxiliary battery and the relative magnitudes of voltage of the main battery and the auxiliary battery, supplying of electric power from the main battery or an integrated power source integrating the main battery voltage with the auxiliary battery voltage, recharging of the main battery and the auxiliary battery respectively or simultaneously, and the connection between the main battery and the auxiliary battery when the portable device is turned off are controlled so that electric power of the portable device using a plurality of batteries can be effectively supplied.

6 Claims, 10 Drawing Sheets

METHOD OF CONTROLLING BATTERY POWER, POWER CONTROL APPARATUS, AND PORTABLE DEVICE USING THE SAME

PRIORITY

This application claims the benefit under 35 U.S.C §119(a) of a Korean patent application filed in the Korean Intellectual Property Office on Aug. 24, 2007 and assigned Serial No. 2007-0085435, the entire disclosure of which is hereby incorporated by reference.

BACKGROUND OF THE INVENTION

1. Field of the Invention

The present invention relates to a method of controlling battery power, a power control apparatus, and a portable device using the same. More particularly, the present invention relates to a method of controlling power supplied from a plurality of batteries according to a difference between the capacity of an internal battery and an external battery, a power control apparatus, and a portable device using the same.

2. Description of the Related Art

Recently, based on advances in communication and electronic technologies, portable devices can implement many advanced optional functions. One field that has been significant in supporting these advanced functions is battery technology. Specifically, the development of technology for increasing the capacity while minimizing the size of a battery. For example, the portable device has a function of reproducing an audio file, a video file, and the like, stored therein. The portable device has also various additional functions such as a camera function for capturing a still image, a video camera function of tracking and capturing a moving picture, and the like. Of course, these additional functions require electric power which is supplied by the advanced batteries.

However, as demand continues to increase from users, portable devices are being supplied with more and more functions and options. Accordingly, the various additional functions could cause a serious problem regarding the supply of electric power under circumstances where the supply of power is limited due to characteristics of the portable device, even when the electric capacity of the battery is remarkably increased. Thus, a solution is needed to overcome the shortage of the limited power supply of a portable device.

SUMMARY OF THE INVENTION

An aspect of the present invention is to address at least the above-mentioned problems and/or disadvantages and to provide at least the advantages described below. Accordingly, an aspect of the present invention is to provide a method of and a power control apparatus for providing a plurality of batteries to solve a limited power supply of a portable device and for effectively controlling the batteries, and a portable device using the same.

In accordance with an aspect of the present invention, a power control method of a portable device comprising a detachable main battery and a detachable auxiliary battery is provided. The power control method includes determining whether the main battery and the auxiliary battery are attached to the portable device, determining the voltage of the main battery and the auxiliary battery, forming one of a plurality of different power supply paths each of the plurality of different supply paths corresponding to whether the batteries are connected and magnitudes of main battery voltage and an auxiliary battery voltage and outputting at least one of the main battery voltage, the auxiliary battery voltage, and an integrated voltage of the main battery voltage and the auxiliary battery voltage to an output unit.

In accordance with another aspect of the present invention, a power control apparatus to which a main battery and an auxiliary battery are detachably mounted is provided. The power control apparatus includes a switch for connecting the main battery to the auxiliary battery, a comparator for outputting a power control signal to the switch to output at least one of a main battery voltage of the main battery and an auxiliary battery voltage of the auxiliary battery to the switch and an output unit for outputting any one of the main battery voltage, the auxiliary battery voltage, and an integrated voltage integrating the main battery voltage with the auxiliary battery voltage in accordance with the output from the comparator.

In accordance with yet another aspect of the present invention, a portable device is provided. The portable device including a power supply unit, to which a main battery and an auxiliary battery are detachably mounted, for controlling a switch disposed between the main battery and the auxiliary battery to independently output a main battery voltage when the main battery voltage is higher than an auxiliary battery voltage, and to output an integrated voltage of integrating the main battery voltage with the auxiliary battery voltage when the main battery voltage is equal to or lower than the auxiliary battery voltage and a controller for supplying a power control signal of controlling the switch.

In an exemplary feature of the present invention, the main battery and the auxiliary battery are used independently or along with each other according to the capacity of the batteries to prevent the main battery from being reversely recharged and to effectively supply electric power to the portable device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, well-known functions and constructions are omitted for clarity and conciseness.

Some elements are exaggerated, omitted, or schematically illustrated in the drawings. As such, actual sizes of respective elements are not necessarily represented in the drawings. Therefore, the present invention is not limited by relative sizes and/or distances in the accompanying drawings.

A portable device in accordance with exemplary embodiments of the present invention may include a main battery and an auxiliary battery, both the main battery and the auxiliary battery providing electric power in association with or independently from each other. The portable device of the present invention may prevent reverse recharging occurring between the main battery and the auxiliary battery and may recharge the main battery using the auxiliary battery when electric power is not additionally supplied.

The main battery and the auxiliary battery included in the portable device in accordance with exemplary embodiments of the present invention are rechargeable batteries such as secondary batteries or chemical batteries, and the auxiliary battery may be a disposable battery. However, in consideration of the environment, productivity and needs of users, both the main battery and the auxiliary battery are preferably rechargeable batteries.

For the purpose of description, a mobile communication terminal is described as an example of a portable device using a plurality of batteries in accordance with the present invention. However, the present invention is not limited in application to a mobile communication terminal and may be applied to other portable devices. The mobile terminal of the present invention may be a terminal that uses a plurality of batteries and may be any terminal such as such as a mobile communication terminal, a mobile phone, wire/wireless phones, a portable internet terminal such as a Personal Digital Assistant (PDA), a smart phone, a lap-top computer and a personal computer, a third-generation terminal such as a Wideband Code Division Multiple Access (WCDMA) terminal and a WiBro portable terminal, any information and communication appliance or multimedia appliance, such as an International Mobile Telecommunication 2000 (IMT 2000) terminal, Global System for Mobile communications (GSM)/General Packet Radio Services (GPRS) terminal, and a Universal Mobile Telecommunications System (UMTS) terminal.

For sake of convenience, the following description of an exemplary embodiment of the present invention refers to a power supply unit. However, it is to be understood that this is merely an example and that other devices or terms for the same device may be used instead, for example a power control circuit, a power control device, and the like. Since this description will be different for more proper and convenient description of exemplary embodiments of the present invention, the above-mentioned terms are assigned to the same device. Moreover, the term "input power" is defined in view of a controller of a portable device so that the input power may be an output device in view of the power supply unit.

Figure 1:
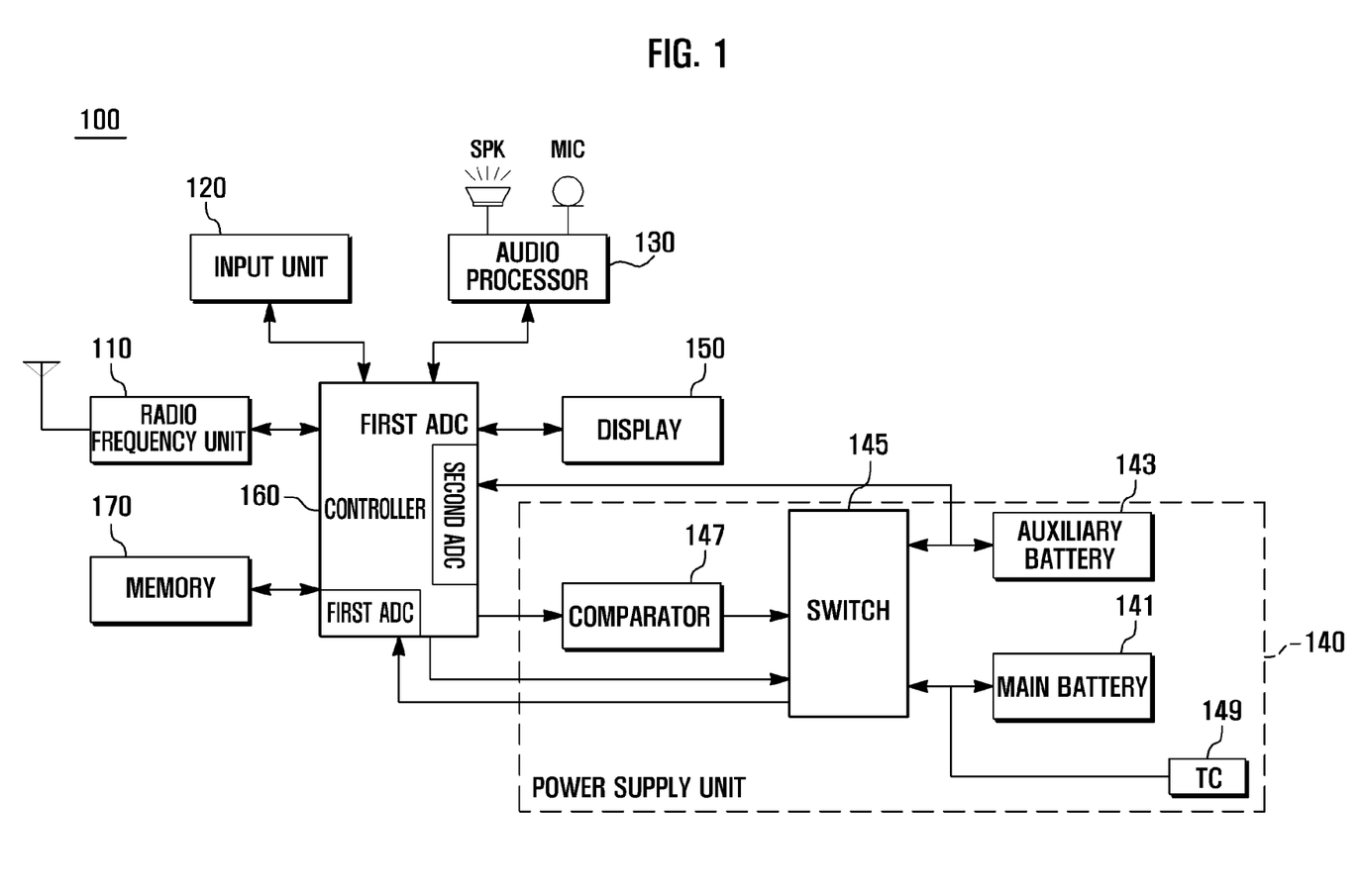
FIG. 1 is a schematic block diagram illustrating a portable terminal in accordance with an exemplary embodiment of the present invention.

FIG. 1 is a schematic block diagram illustrating a portable terminal in accordance with an exemplary embodiment of the present invention.

Referring to FIG. 1, a portable device 100 in accordance with an exemplary embodiment of the present invention may include a radio frequency unit 110, an input unit 120, an audio processor 130, a power supply unit 140, a display 150, a memory unit 170, and a controller 160. The power supply unit 140 may include any number of batteries. However, for convenience of description, a power supply unit 140 including two batteries, that is, a main battery 141 and an auxiliary battery 143 will be described.

The radio frequency unit 110 is included when the portable device 100 is a mobile communication terminal, and provides services relating to mobile communication of the portable device 100. In other words, the radio frequency unit 110 transmits and receives voice call data or video call data under the control of the controller 160. The radio frequency unit 110 may include a radio frequency transmitter for up-converting and amplifying the frequency of a signal to be transmitted. The radio frequency unit 110 may also include a radio frequency receiver for performing low-noise amplification on a received signal and down-converting the frequency of the received signal. The radio frequency unit 110 may be supplied with electric power from at least one of the batteries included in the power supply unit 140 and operate under the control of the controller 160.

The input unit 120 includes a plurality of input keys and function keys for receiving number information or text information and for setting various functions. The function keys may include an arrow key, a side key, a shortcut key, and the like, set to perform specific functions. The input unit 120 creates a key signal input in association with a setting by a user and functional control of the portable device 100, and transmits the key signal to the controller 160.

The input unit 120 creates an input signal for interrupting the supply of electric power from the power supply unit 140 and an input signal for starting the supply of electric power, for example to turn off and turn on the portable device 100. The input unit 120 directly provides the input signals to the power supply unit 140. In this case, the input signals may be the same pattern. For example, to turn the portable device 100 off, the power supply interrupting signal may be an input signal in the form of pressing a power key for a relatively long duration when the portable device 100 is turned on. Similarly, the power supply starting signal may be an input signal in the form of pressing a power key for a relatively long duration when the portable device 100 is turned off. Such input signals may be modified by design and input signals of another pattern may be assigned to the power supply interrupting signal and the power supply starting signal respectively.

The audio processor 130 includes a speaker SPK for outputting sound when reproducing audio files received by and/or stored by the portable device 100, and a microphone MIC for collecting voice input of a user and/or other audio signals.

The audio processor 130 may output various signals to distinguish between different statuses regarding the supply of electric power. For example, the various signals and statuses regarding the supply of electric power may include the outputting of a log screen and an audio signal that are previously stored when electric power is normally supplied, an audible indication when the log screen is transitioned to a stand-by screen, an indication alarming of a shortage of the electric power, an indication alarming that the portable device will be turned off due to the shortage of electric power, and an indication that the portable device has been turned off. In an exemplary implementation, the audio processor 130 may output an audio signal alarming that the main battery 141 is connected to or separated from the auxiliary battery 143 under the control of the controller 160.

The power supply unit 140 interrupts the supply of electric power according to an input signal from the input unit 120 of the portable device 100. The power supply unit 140 also controls the supply of electric power under the control of the controller 160 after the supply of the electric power has been initiated. In other words, if a power key is pressed when the portable device 100 is turned off, the power supply unit 140 supplies electric power to respective components of the portable device 100 from at least one battery through the controller 160 according to a connection state between the main battery 141 and the auxiliary battery 143. If the power key is pressed when the portable device 100 is turned on, the power supply unit 140 may stop the supply of electric power by interrupting an electric signal line connected to the main battery 141 and/or the auxiliary battery 143. In this case, the power supply unit 140 may include a reverse recharging prevention device that effectively supplies electric power from the main battery 141 and the auxiliary battery 143 and prevents the auxiliary battery 143 from being recharged by the main battery 141. In other words, the power supply unit 140, as illustrated in the drawings, may include a Travel Charger (hereinafter, referred to as 'TC') 149 for recharging the main battery 141 and the auxiliary battery 143, in addition to the main battery 141, the auxiliary battery 143, a switch 145, and a comparator 147. The power supply unit 140 may supply a voltage from the main battery 141 and an integrated voltage of the main battery 141 and the auxiliary battery 143 to the controller 160, independently. Furthermore, the controller 160 may control the power supply unit 140 to display remaining capacity of the batteries, and its operation will be described in more detail below together with a description of operation of the display 150.

The main battery 141 may be detachable from the portable device 100, and as described above, is preferably of a rechargeable type. The main battery 141 is mounted in a mounting space of the portable device 100, and a case may be provided to protect the main battery. The main battery 141 is connected to the switch 145 to supply electric power to the controller 160 and the comparator 147 respectively. In this case, the electric power supplied to the comparator 147 may be a reference power. The main battery 141 may supply the electric power or stop the supplying of the electric power to the controller 160 under the control of the switch 145. A signal activating the switch 145 may correspond to the input signal of the power key of the input unit 120.

The auxiliary battery 143, similar to the main battery 141, may be detachable and may be a disposable battery or a rechargeable battery. In an exemplary implementation, the auxiliary battery 143 is externally attached to the portable device 100 rather than having a specific space where the auxiliary battery 143 is mounted in the portable device 100. In other words, the auxiliary battery 143 is connected to a connection terminal formed at a side of the portable device 100 to supply electric power to the portable device 100. The auxiliary battery 143 is connected to the switch 145 to supply electric power to the main battery 141 and the controller 160 by the control of the switch 145.

As illustrated in FIG. 1, the switch 145 is placed so that the main battery 141 and the auxiliary battery 143 are on a first side and the comparator 147 and the controller 160 are on a second side. The switch 145 may control the supplying of electric power from the main battery 141, from the auxiliary battery 143, or the power caused by a voltage difference between the main battery 141 and the auxiliary battery 143, in accordance with the control of the controller 160 and the input signal of the input unit 120. The switch 145 controls the electric power of the main battery 141 and the integrated voltage of the main battery 141 and the auxiliary battery 143 to be supplied to the controller 160. The switch 145 may form an electrical path between the main battery 141 and the auxiliary battery 143 when the main battery 141 and the auxiliary battery 143 are both mounted or attached, the portable device 100 is turned off, and the electric power of the auxiliary battery 143 is greater than that of the main battery 141. The switch 145 may also control the auxiliary battery 143 to recharge the main battery 141.

The comparator 147 is positioned between the controller 160 and the switch 145. The comparator 147 provides a power control signal supplied from the controller 160 to the switch 145 by considering the electric power of the main battery as the reference voltage. By doing so, the comparator 147 may interrupt the electric connection between the auxiliary battery 143 and the main battery 141 when a voltage of the main battery 141 is higher than a voltage of the auxiliary battery 143. Furthermore, the comparator 147 may electrically connect the auxiliary battery 143 to the main battery 141 when a voltage of the main battery 141 is lower than a voltage of the auxiliary battery 143, and supply the integrated voltage of the main battery 141 and the auxiliary battery 143 to the controller 160.

The TC 149 is connected to a connector formed at a side of the portable device 100 to supply a recharging voltage to the portable device 100. The TC 149 is electrically connected to the main battery 141 and may be connected to the auxiliary battery 143 via the switch 145. Respective components of the power supply unit 140 will be described in more detail with reference to the accompanying drawings.

The display 150 provides various functional screens of the portable device 100, such as a turned-on screen, a turning-off stage screen, a stand-by screen, a menu screen, a reproduction screen of a video file and the like. The display 150 may be a Liquid Crystal Display (LCD), and in this case, the display 150 may include an LCD controller, a memory for storing data, and an LCD display device. When the LCD is implemented by a touch-screen type, a screen of the display 150 may be operated as an input unit.

Figure 2:
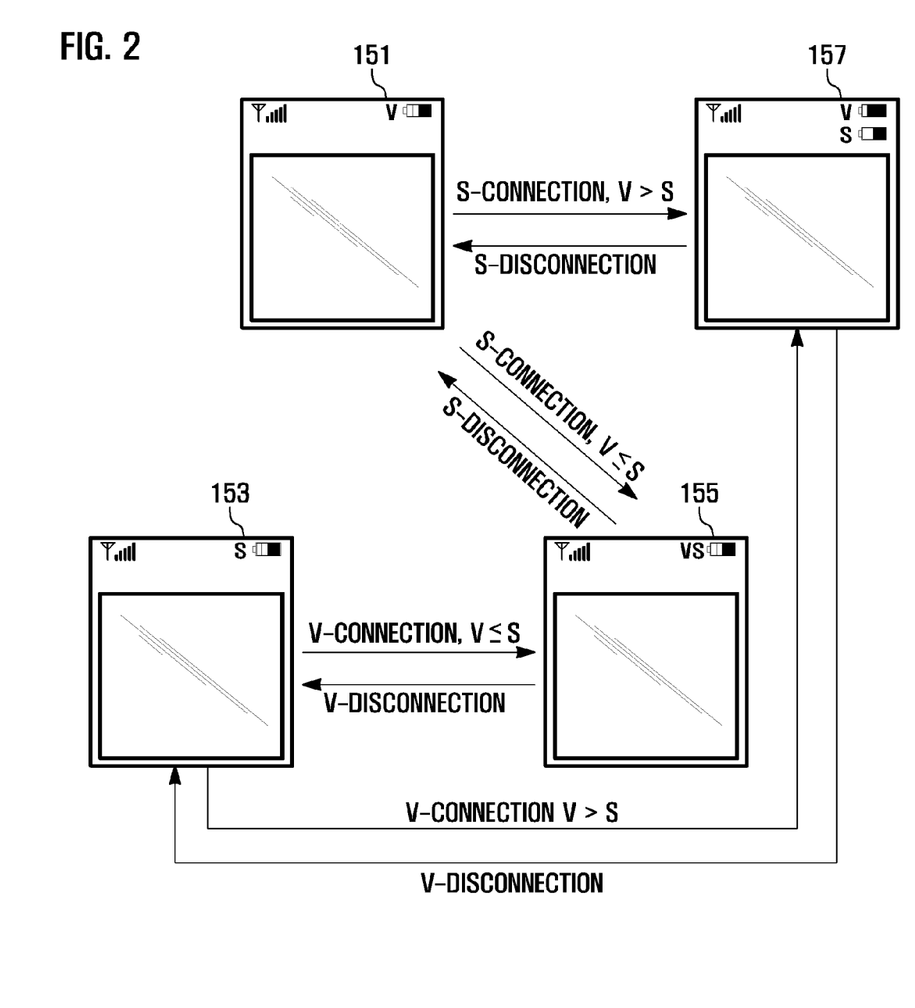
FIG. 2 is a flow chart illustrating a screen displaying battery capacity on a display of the portable device, in accordance with an exemplary embodiment of the present invention.

FIG. 2 is a flow chart illustrating a screen for displaying battery capacity on a display of the portable device according to an exemplary embodiment of the present invention.

In an exemplary implementation, the display 150, as illustrated in FIG. 2, may display an icon and/or a pop-up message displaying a capacity of the main battery 141, a capacity of the auxiliary battery 143, and an integrated capacity of the main battery 141 and the auxiliary battery 143, respectively. In an exemplary implementation, the pop-up message includes messages related to a low voltage status of the main battery 141, a low voltage status of the auxiliary battery 143 and a completely consumed status of either the main or auxiliary battery.

When the main battery 141 only is connected to the portable device 100, the controller 160 may determine a capacity of the main battery 141 and display it on a portion of a screen 151 as illustrated in FIG. 2. When only the auxiliary battery 143 is connected to the portable device 100, the controller 160 may determine a capacity of the auxiliary battery 143 and may display the capacity on a portion of a screen 153 as illustrated in FIG. 2. In either of these events, the displaying of the capacity of the main battery 141 or the capacity of the auxiliary battery 143 preferably includes the display of indicators that are different from each other to distinguish the main battery from the auxiliary battery. In the example of FIG. 2 an "S" is used to designate the auxiliary battery 141 and a "V" is used to designate the main battery 141. When the main battery 141 and the auxiliary battery 143 operate as an integrated power source, a capacity of the integrated power source may be displayed on a portion of a screen 155 as illustrated in FIG. 2. Alternatively, when the main battery 141 is connected to the auxiliary battery 143 and they work as independent power sources, individual capacities of the main battery 141 and the auxiliary battery 143 may be displayed respectively on a portion of a screen 157 as illustrated in FIG. 2. The screen 155 of FIG. 2 indicates that the main battery 141 and the auxiliary battery 143 are electrically connected to each other and thus have the same magnitude of voltages. In an exemplary implementation, the main battery 141 and the auxiliary battery 143 are connected to each other when the capacity of the main battery 141 is lower than that of the auxiliary battery 143. In this case, the individual capacities of the main battery 141 and the auxiliary battery 143 are preferably not displayed independently. When the capacity of the main battery 141 is higher than that of the auxiliary battery 143, the portable device 100 is preferably configured such that the main battery 141 is electrically disconnected from the auxiliary battery 143 and the capacities of the main battery 141 and the auxiliary battery 143 are independently displayed on a screen 157 as illustrated in FIG. 2. The display 150 displays the capacities of the integrated power source, the main battery 141, and the auxiliary battery 143. Furthermore, the display 150 may display a type and a capacity of a currently connected battery as determined by the controller 160 when one of the main battery 141 and the auxiliary battery 143 is separated from the portable device 100. In this case, the display 150 may omit to display the capacity of the integrated power source.

The memory 170 stores a program required to perform various functions of portable device 100, an algorithm for power control, user data, and an application program for operating the radio frequency unit 110 when the portable device 100 is a mobile communication terminal. The memory 170 may temporarily store information about the current capacities of the main battery 141 and the auxiliary battery 143. The memory 170 may roughly include a program region and a data region and include either or both volatile and non-volatile memories.

In the program region, an Operating System (OS) for booting the portable device 100, and programs required to perform optional functions supported by the portable device 100, such as a function of reproducing sound and an image and/or a moving picture are stored. Furthermore, in the program region, a power controlling algorithm to effectively operate components included in the power supply unit 140 according to a status of the connection between the main battery 141 and the auxiliary battery 143 and the capacities thereof may be stored. The portable device 100 provides the above-mentioned functions using corresponding application programs under the control of the controller 160 when the functions are activated in correspondence with a user's demand and depending upon the connection between the batteries.

The data region is a region for storing data which is generated when the portable device 100 is used. Also, user data related to the various optional functions provided by the portable device 100, such as a moving picture, a phonebook data, audio data, corresponding content, and/or information corresponding to the user data may be stored. Especially, in the data region, signals transmitted from the power supply unit 140, such as the capacity of the main battery 141, and the capacity of the auxiliary battery 143 may be stored temporarily and in real time. Any of the stored information may be output to the display 150 under the control of the controller 160.

Although the portable device 100 having a configuration for storing the information transmitted from the power supply unit 140 in the memory 170 has been described as an example, the portable device 100 may also include a buffer provided in the controller 160 to process information related to the power supply unit 140 required to control the power supply unit 140. In other words, in the portable device 100, the power control algorithm stored in the program region, and the information related to the power supply unit 140 stored in the data region may be processed through a memory provided in the controller 160.

The controller 160 creates a control signal for controlling the respective components of the portable device 100 and controls signals transmitted and received between the respective components. The controller 160, in a case where the portable device 100 supports a mobile communication function and a file reproducing function, may have a MODEM function and a CODEC function for processing the signals and files to be transmitted and received. The controller 160 may adjust signals to be supplied to the switch 145 and the comparator 147 to control the electric power of the power supply unit 140, based on information transmitted from the power supply unit 140. For example, the controller 160 may adjust signals based on information such as whether the main battery 141 is connected to the auxiliary battery 143, the capacity of the main battery 141 and the capacity of the auxiliary battery 143. The controller 160 may be supplied with the voltage of the main battery 141 or with the integrated voltage of the main battery 141 and the auxiliary battery 143, using a port connected to the switch 145 such as a first ADC port. The controller 160 may determine the capacity of the auxiliary battery 143 using a port connected to the auxiliary battery 143 such as a second ADC port. A method of controlling electric power of the portable device 100 performed by the controller 160 will be described in more detail with reference to the accompanying drawings later.

Figure 3A:
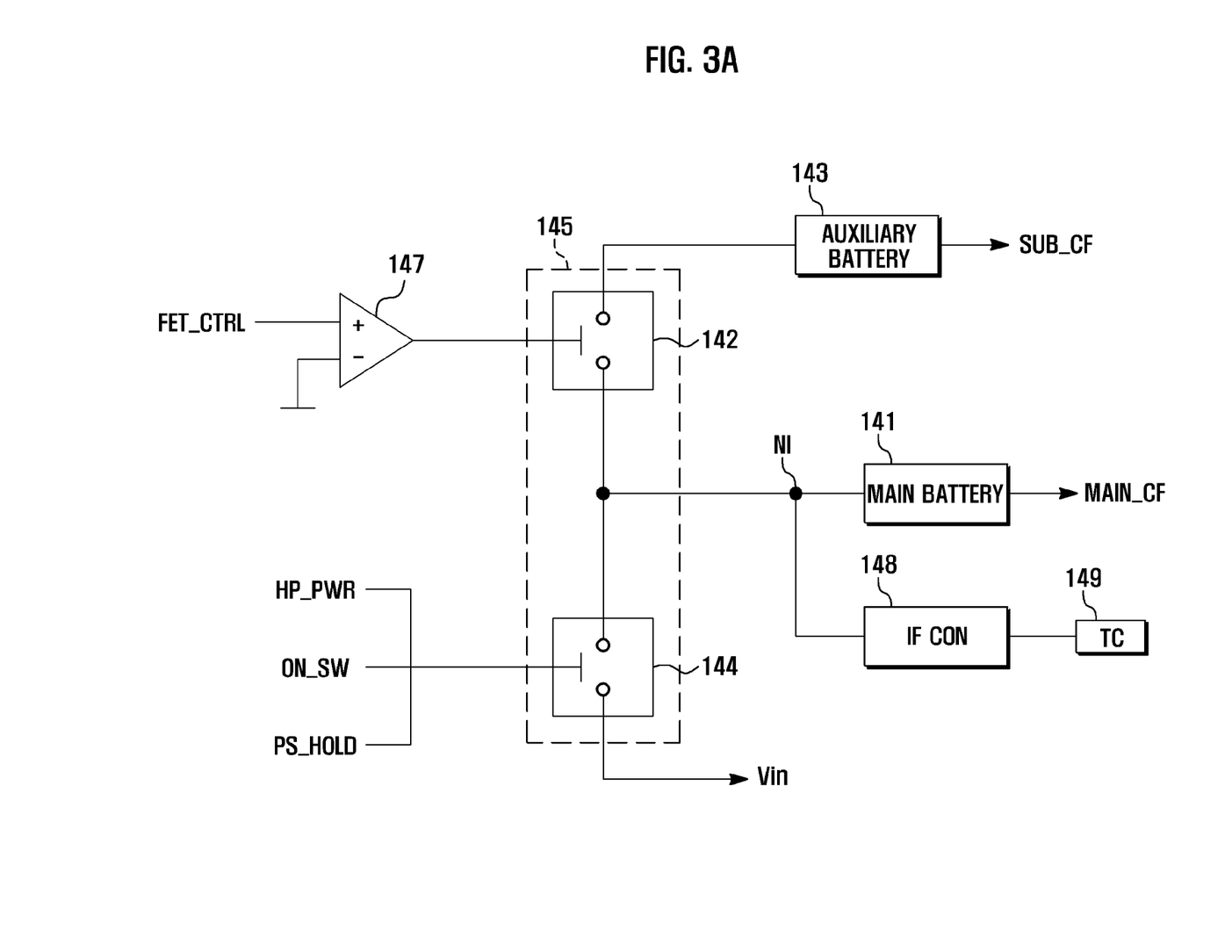
FIGS. 3A and 3B are a schematic block diagram and a practical circuit diagram illustrating a power control apparatus in accordance with an exemplary embodiment of the present invention.
Figure 3B:
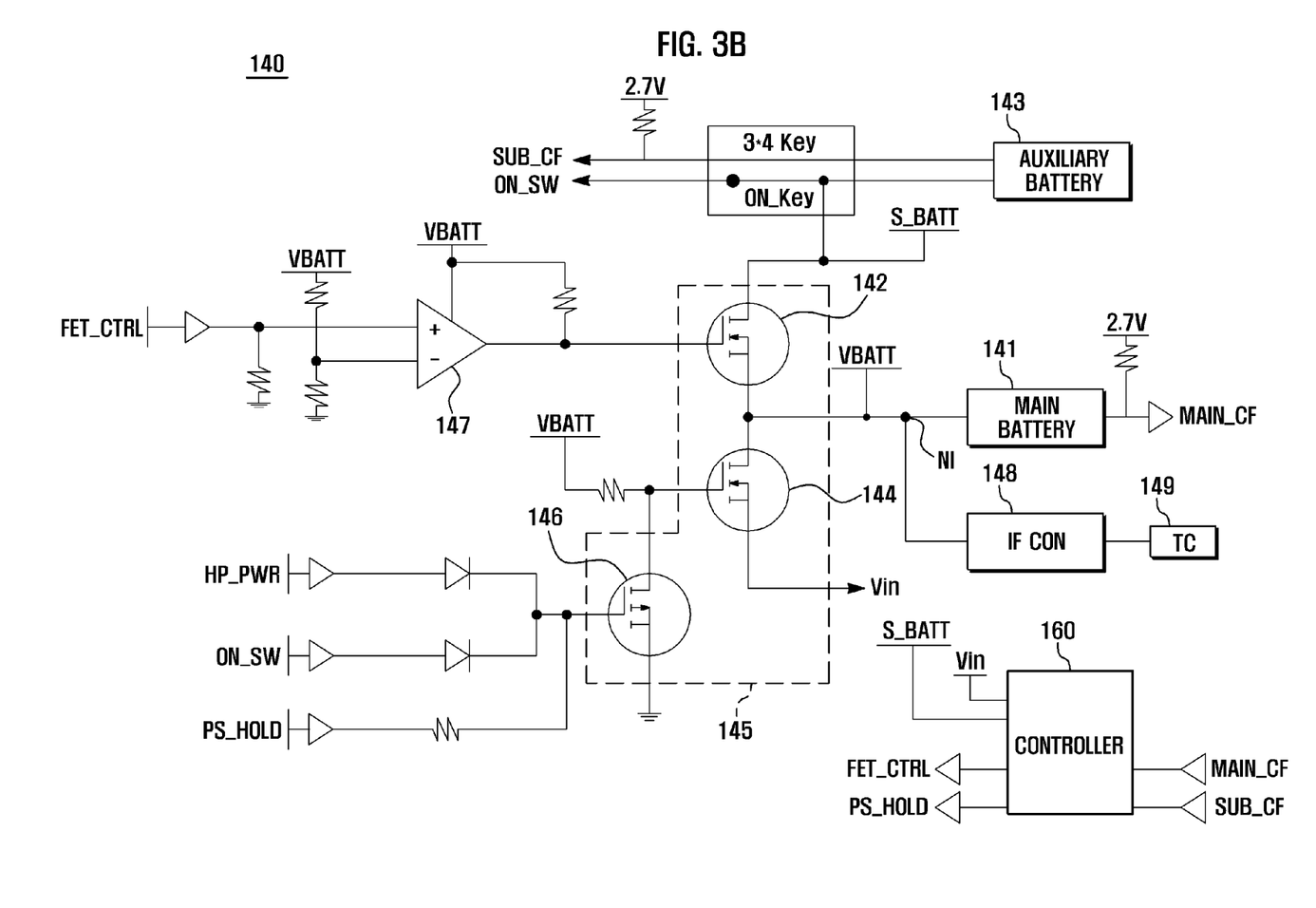

FIG. 3A is a view illustrating a power control apparatus in accordance with an exemplary embodiment of the present invention, that is, an example of a power control circuit by a block diagram. FIG. 3B is a circuit diagram illustrating the power control apparatus implementing the power control circuit to be applied to the portable device 100. In this case, FIG. 3B illustrates devices added to be applied to a specific portable device 100. Accordingly, it is to be understood that characteristics and positions of the devices in FIG. 3B may be changed in accordance with a change of features and additional functions of the portable device 100.

Referring to FIG. 3A, the power control circuit in accordance with an exemplary embodiment of the present invention includes a main battery 141, a connector 148 connected to the main battery 141, a TC 149 connected to the connector 148, a first node N1 between the main battery 141 and the connector 148, an auxiliary battery 143, a first switch 142 positioned between the main battery 141 and the auxiliary battery 143, a comparator 147 controlling activation of the first switch 142, and a second switch 144 positioned between the first node N1 and an input voltage Vin. A power control signal FET_CTRL is supplied from the controller 160 to the comparator 147. The second switch 144 is supplied with a power maintaining signal PS_HOLD from the controller 160, a power signal ON_SW corresponding to a turn-on or a turn-off signal from the input unit 120, and a test voltage signal HP_PWR input through a jig for the development and test of the portable device 100. The second switch 144 is activated according to the nature of the signals that are input.

The controller 160 detects a main battery connection signal MAIN_CF when the main battery 141 is connected to the portable device 100. Similarly, the controller 160 detects an auxiliary battery connection signal SUB_CF when the auxiliary battery 143 is connected to the portable device 100. By detecting these signals, the controller 160 may determine whether the main battery 141 and/or the auxiliary battery 143 are connected to the portable device 100. The input voltage Vin may be assigned to an input port formed on the controller 160. In other words, in the power control circuit, the electric power from the main battery 141 and the auxiliary battery 143 is provided to the controller 160 in the form of the input voltage Vin. The controller 160 may use a magnitude of the input voltage Vin, the auxiliary battery connection signal SUB_CF, the capacity of the auxiliary battery 143, and the main battery connection signal MAIN_CF to determine whether the input power is supplied from the main battery 141, the auxiliary battery 143, or the integrated voltage of the main battery 141 and the auxiliary battery 143.

The connector 148 is an interface positioned between the first node N1 and the TC 149. The connector 148 may have a configuration coupled or integrated with the TC 149. The power control circuit having the connector 148 first controls to supply a recharging voltage from the TC 149 to the main battery 141 when the power control circuit is connected to the main battery 141 and the TC 149. When the main battery 141 is fully recharged and the auxiliary battery 143 is connected, the power control circuit activates the first switch 142 to form an electric path through the auxiliary battery 143, the connector 148, and the TC 149 and to supply the recharging voltage to the auxiliary battery 143.

Hereinafter, the power control circuit in accordance with an exemplary embodiment of the present invention will be described in more detail. In the following description, the electric power supplied from the main battery 141 is defined by a voltage of the main battery 141, that is, VBATT, and the electric power supplied from the auxiliary battery 143 is defined by a voltage of the auxiliary battery, that is, S-BATT. A resistor may be arranged for the purpose of distributing voltage, stabilizing a circuit, and the like.

Referring to FIG. 3B, a power control circuit in accordance with an exemplary embodiment of the present invention includes a main battery 141, an auxiliary battery 143, a first switch 142 disposed between the main battery 141 and the auxiliary battery 143, a second switch 144 disposed between the first switch 142 and the input voltage Vin, and a third switch 146 for controlling the activation of the second switch 144. In an exemplary implementation as illustrated in FIG. 3B, the first switch 142 and the second switch 144 may each be implemented with a P-channel MOSFET and the third switch 146 may be implemented with an N-channel MOSFET. The first switch 142 is activated by an output from the comparator 147, and the activation of the second switch 144 is determined according to a status of the third switch 146. The third switch 146 is activated according to which of the power maintaining signal PS_HOLD, the power signal ON_SW, and the test voltage signal HP_PWR is input. The auxiliary battery 143 creates the power signal ON_SW in response to a specific key input of the input unit 120 when the auxiliary battery 143 is connected to the portable device 100. The power signal ON_SW may be supplied as an input to the third switch 146. The comparator 147 compares the power control signal FET_CTRL with the main battery voltage VBATT to supply the same to the first switch 142. The power control signal FET_CTRL corresponds to one of a "Low" signal or "High" signal.

The operation of the power control circuit in accordance with an exemplary embodiment of the present invention will be described in detail with reference to the accompanying drawings. Prior to the description, a switching device to be described below will be described by a MOSFET having a drain terminal, a source terminal, and a gate terminal, but the present invention is not limited thereto. In other words, any switching device capable of controlling power flow in response to a signal input to a side of the switching device may be used as the switching device of the present invention. For example, MOSFET may be substituted by BJT, JFET, and the like.

Figure 4:
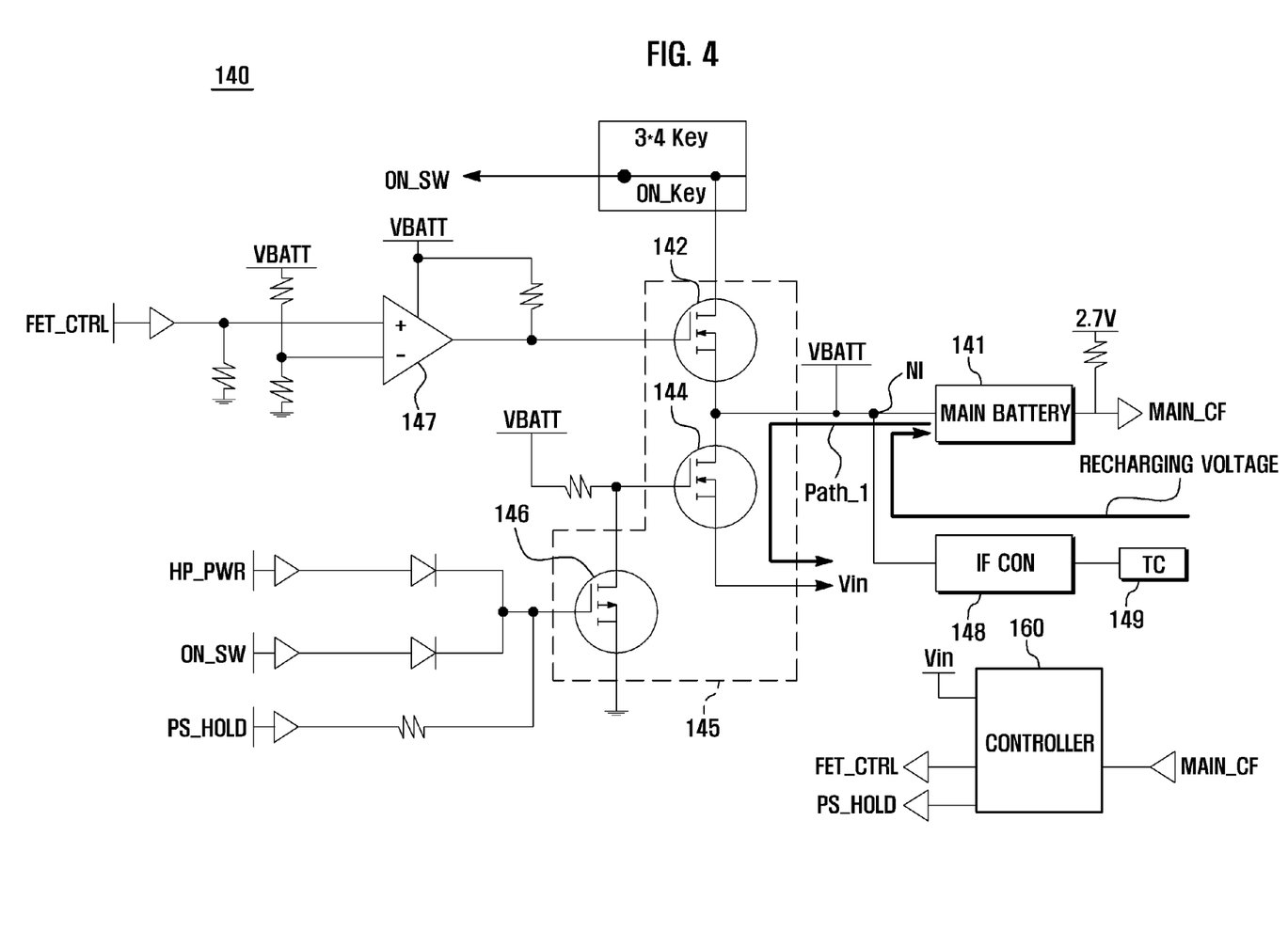
FIG. 4 is a circuit diagram illustrating flows of an output power and recharging voltage when only a main battery is mounted, in accordance with an exemplary embodiment of the present invention.

FIG. 4 is a circuit diagram illustrating a power control circuit and the forming of an electric path when only a main battery 141 is connected to the power control circuit.

Referring to FIG. 4, when the main battery 141 is connected, the main battery 141 transmits the main battery connection signal MAIN_CF to the controller 160. By transmitting the main battery connection signal MAIN_CF to the controller 160, a pull-up voltage of 2.7 V is pulled down due to the connection of the main battery 141. In other words, the controller 160 recognizes that the main battery 141 is not mounted when "High" is maintained at a port to determine whether the main battery 141 is connected and that the main battery 141 is mounted when the signal is changed to "Low." After the connection of the main battery 141, when the power signal ON_SW is created from the input unit 120, the third switch 146 is activated by the input of the power signal ON_SW. The power signal ON_SW may be created by the input unit 120, for example, the activation of the power key ON_KEY of the keypad. In an exemplary implementation, the keypad is a 3×4 keypad. After that, the voltage VBATT of the main battery 141, connected to a gate terminal of the second switch 144, is connected to a ground terminal via the third switch 146. Consequently, the second switch 144 is activated to form a first path Path_1 connected to the main battery 141, the first node N1, the second switch 144, and the input voltage Vin so that the electric power of the main battery 141 as the input voltage Vin is supplied to the controller 160 through the path Path_1. The controller 160 supplies the power maintaining signal PS_HOLD to the third switch 146 to maintain the first path Path_1 and to support the supply of the main battery voltage VBATT.

In this case, when the TC 149 is connected to the connector 148 to supply the recharging voltage, the recharging voltage is supplied to the main battery 141 through the connector 148 and the first node N1 such that the main battery 141 is recharged. Meanwhile, the recharging voltage may also be supplied as the input voltage Vin through the first path Path_1 formed when the main battery voltage VBATT is supplied as the input voltage Vin.

Figure 5:
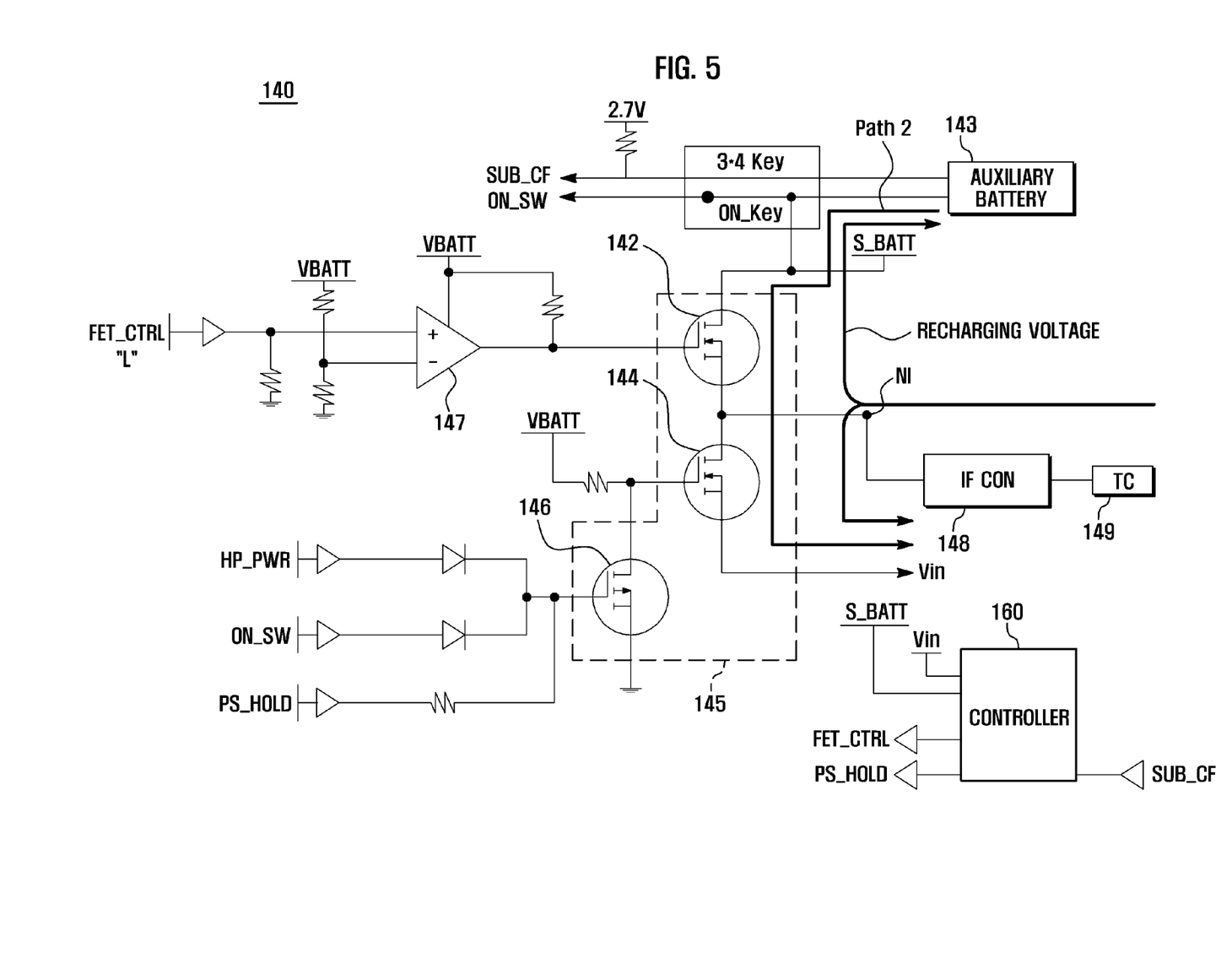
FIG. 5 is a circuit diagram illustrating flows of an output power and recharging voltage when only an auxiliary battery is mounted, in accordance with an exemplary embodiment of the present invention.

FIG. 5 is a circuit diagram illustrating a power control circuit and the forming of an electric path when only an auxiliary battery 143 is connected to the power control circuit.

Referring to FIG. 5, when the auxiliary battery 143 is connected, the auxiliary battery connection signal SUB_CF is transmitted to the controller 160. The power signal ON_SW, generated by the input of a specific power key ON_KEY of the input unit 120, is transmitted to the third switch 146. The auxiliary battery voltage S_BATT supplied from the auxiliary battery 143 is supplied to a drain terminal of the first switch 142. In this case, the gate terminal of the first switch 142 is connected to an output terminal of the comparator 147 and the main battery voltage VBATT. The first switch 142 is activated by the auxiliary battery voltage S-BATT supplied to the drain terminal because the main battery voltage VBATT is not supplied at this time. In other words, the drain terminal and a source terminal of the first switch 142 form an electric path through which electric power is supplied due to parasitic current caused by a voltage difference between the drain terminal and the gate terminal of the first switch 142. A power signal ON_SW, created by the connection of the auxiliary battery 143, activates the third switch 146. By activation of the third switch 146, the second switch 144 is activated in the same way as that of the first switch 142 and the auxiliary battery voltage S_BATT is supplied as the input voltage Vin. Consequently, the auxiliary battery voltage S_BATT may be supplied to the controller 160 through the second path Path_2 formed by the first switch 142, the second switch 144, and the input voltage Vin. In this case, the auxiliary battery connection signal SUB_CF may be transmitted to the controller 160 in a manner similar to the case of the main battery connection signal MAIN_CF. In other words, the auxiliary battery connection signal SUB_CF is transmitted to the controller 160 by which the pull-up voltage 2.7 V is pulled down when the pull-up voltage 2.7 V is connected and the auxiliary battery 143 is connected. After the input of the power signal ON_SW, the controller 160 supplies the power maintaining signal PS_HOLD to the third switch 146 to maintain the second path Path_2 and to support the supplying of the auxiliary battery voltage S_BATT to the input voltage Vin.

In this case, when the TC 149 is connected to the connector 148 to supply the recharging voltage, the recharging voltage is supplied to the auxiliary battery 143 through the connector 148, the first node N1, and the first switch 142 to recharge the auxiliary battery 143. To this end, the controller 160 preferably supplies the power control signal FET_CTRL to be supplied to the first switch 142 in the form of a low voltage, that is, a "Low" signal to activate the first switch 142. The recharging voltage may be supplied as the input voltage Vin through the first node N1 and the second switch 144.

Figure 6A:
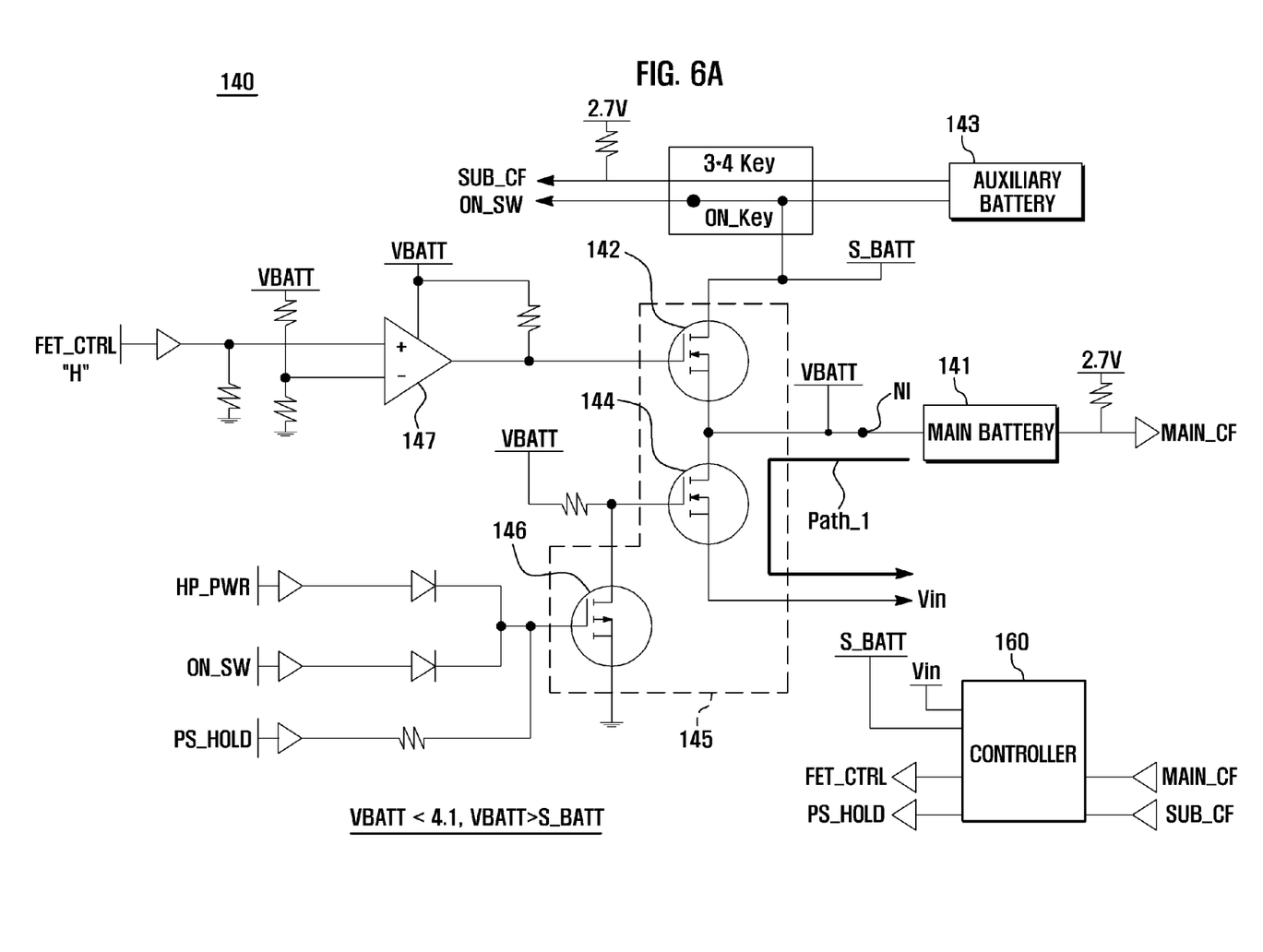
FIGS. 6A and 6B are circuit diagrams illustrating a flow of an output power according to capacity of a main battery and an auxiliary battery when the main battery and the auxiliary battery are mounted, in accordance with an exemplary embodiment of the present invention.
Figure 6B:
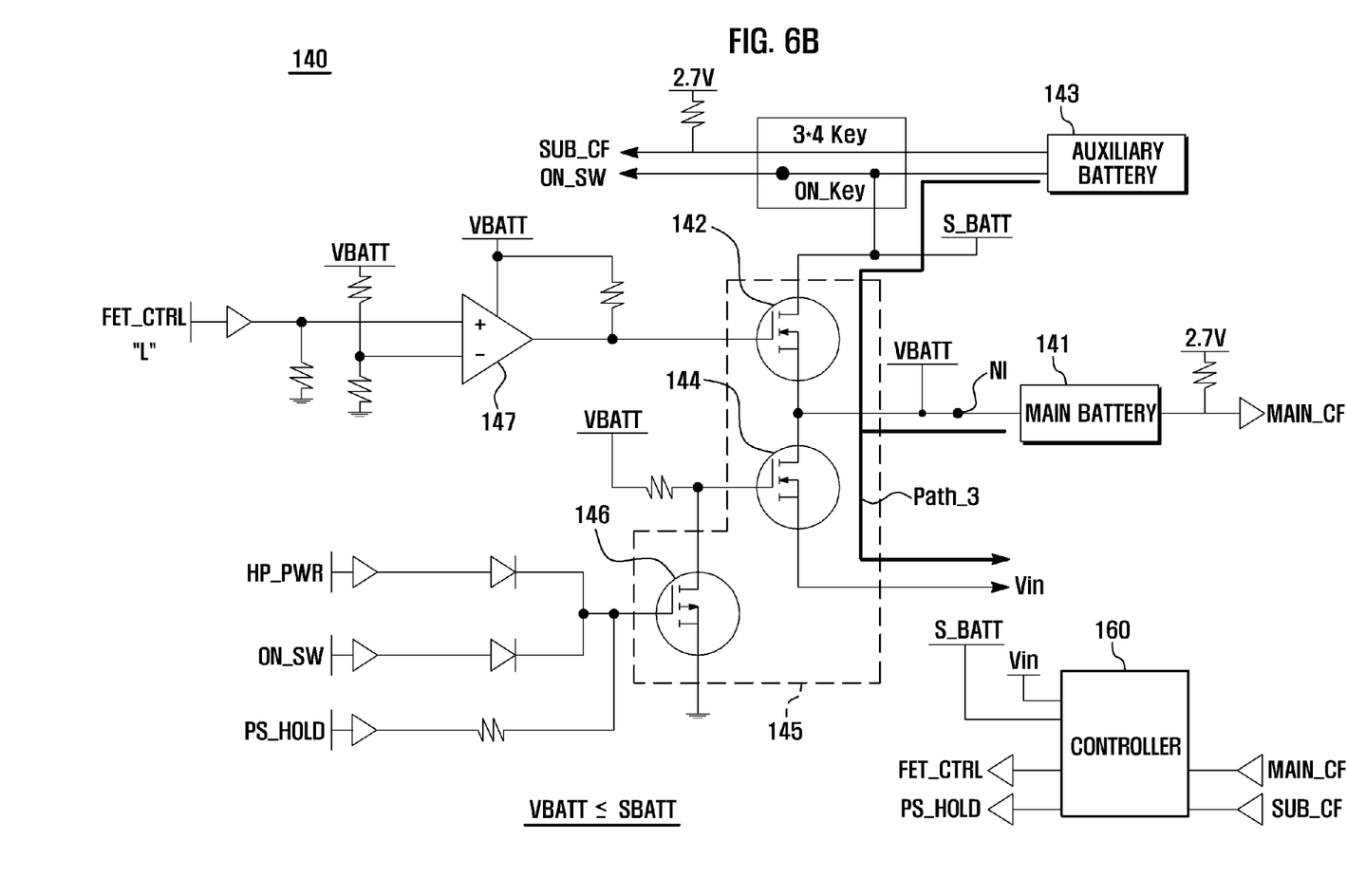

FIGS. 6A and 6B are circuit diagrams illustrating the forming of an electric path in the power control circuit when the main battery 141 and the auxiliary battery 143 are both connected to the power control circuit.

As illustrated in FIGS. 6A and 6B, when the main battery 141 and the auxiliary battery 143 are connected to the portable device 100, the main battery connection signal MAIN_CF and the auxiliary battery connection signal SUB_CF are transmitted to the controller 160. For example, the main battery connection signal MAIN_CF and the auxiliary battery connection signal SUB_CF may be transmitted to the controller 160 by which their pull-up voltages 2.7 V are pulled down. Accordingly, the controller 160 can determine that the main battery 141 and the auxiliary battery 143 are connected. The controller 160 compares the auxiliary battery voltage S_BATT input from the auxiliary battery 143 with the input voltage Vin to determine the magnitudes of the main battery voltage VBATT and the auxiliary battery voltage S_BATT. In more detail, when it is determined that the main battery 141 and the auxiliary battery 143 are both connected, the controller 160 supplies the power control signal FET_CTRL having a "High" state to inactivate the first switch 142. With the first switch 142 inactive, the auxiliary battery voltage S_BATT is independently supplied to the second ADC port and the main battery voltage VBATT is supplied to the first ADC port through the first path Path_1. Consequently, the controller 160 can independently receive the auxiliary battery voltage S_BATT and the main battery voltage VBATT respectively. The controller 160 determines relative magnitudes of the auxiliary battery voltage S_BATT and the main battery voltage VBATT and determines how to control the first switch 142.

FIG. 6A is a circuit diagram illustrating a path formed in a power control circuit when a voltage of the main battery 141 is lower than a threshold voltage, for example 4.1 V and greater than a voltage of the auxiliary battery 143.

When the auxiliary battery 143 and the main battery 141 are connected to the power supply unit 140, the respective pull-down signals are transmitted to preset ports of the controller 160. The controller 160 may secure ports respectively for detecting the auxiliary battery voltage S_BATT and the main battery voltage VBATT to display magnitudes of the main battery voltage VBATT and the auxiliary battery voltage S_BATT on the display 150 as illustrated by a reference numeral 157 of FIG. 2. In more detail, when the auxiliary battery 143 and the main battery 141 are connected, the controller 160 creates and transmits the power control signal FET_CTRL as a "High" signal to inactivate the first switch 142. By doing so, the controller 160 obtains the main battery voltage VBATT as an input voltage Vin at the first ADC port and the auxiliary battery voltage S_BATT at the second ADC port. In this case, when the auxiliary battery voltage S_BATT is lower than the main battery voltage VBATT, the controller 160 interrupts the connection between the main battery voltage VBATT and the auxiliary battery voltage S_BATT using the first switch 142 and displays the individual capacities of the batteries on the screen 157 of the display 150.

FIG. 6B is a circuit diagram illustrating the power control circuit and a path formed when the main battery voltage VBATT is lower than the auxiliary battery voltage S_BATT. A case where the main battery voltage VBATT is equal to or lower than the auxiliary battery voltage S_BATT may include a case where the main battery voltage VBATT is initially higher than the auxiliary battery voltage S_BATT but the main battery voltage VBATT is independently supplied and consumed and finally is lower than the auxiliary battery S_BATT. A case where the main battery voltage VBATT is equal to or lower than the auxiliary battery voltage S_BATT may include a case where only the main battery 141 is initially connected and an auxiliary battery 143 having an auxiliary battery voltage S_BATT higher than the main battery voltage VBATT is newly connected.

Referring to FIG. 6B, when the auxiliary battery voltage S_BATT is higher than the main battery voltage VBATT, the controller 160 controls and transmits the power control signal FET_CTRL as a "Low" signal to the comparator 147. Thus, the first switch 142 is activated. The auxiliary battery voltage S_BATT flows to the first node N1 via the activated first switch 142. The second switch 144 is activated by any one of the test voltage signal HP_PWR, the power signal ON_SW, and the power maintaining signal PS_HOLD as described above, and the auxiliary battery voltage S_BATT is supplied as an input voltage Vin via the second switch 144. In this case, the main battery voltage VBATT shares the first node N1 with the auxiliary battery voltage S_BATT so that the main battery voltage VBATT and the auxiliary battery voltage S_BATT have voltages of identical magnitude. Thus, the auxiliary battery voltage S_BATT and the main battery voltage VBATT are integrated at the first node N1 included in a third path Path_3 and are supplied as an integrated voltage to the input voltage Vin. The third path Path_3 integrates the path connecting the auxiliary battery 143, the first switch 142, the first node N1, and the second switch 144 with the path connecting the main battery 141, the first node N1, and the second switch 144. Furthermore, when the main battery voltage VBATT and the auxiliary battery voltage S_BATT are integrated to form an integrated voltage, the controller 160 may control the integrated voltage to be displayed as the screen 155 of FIG. 2.

Figure 7A:
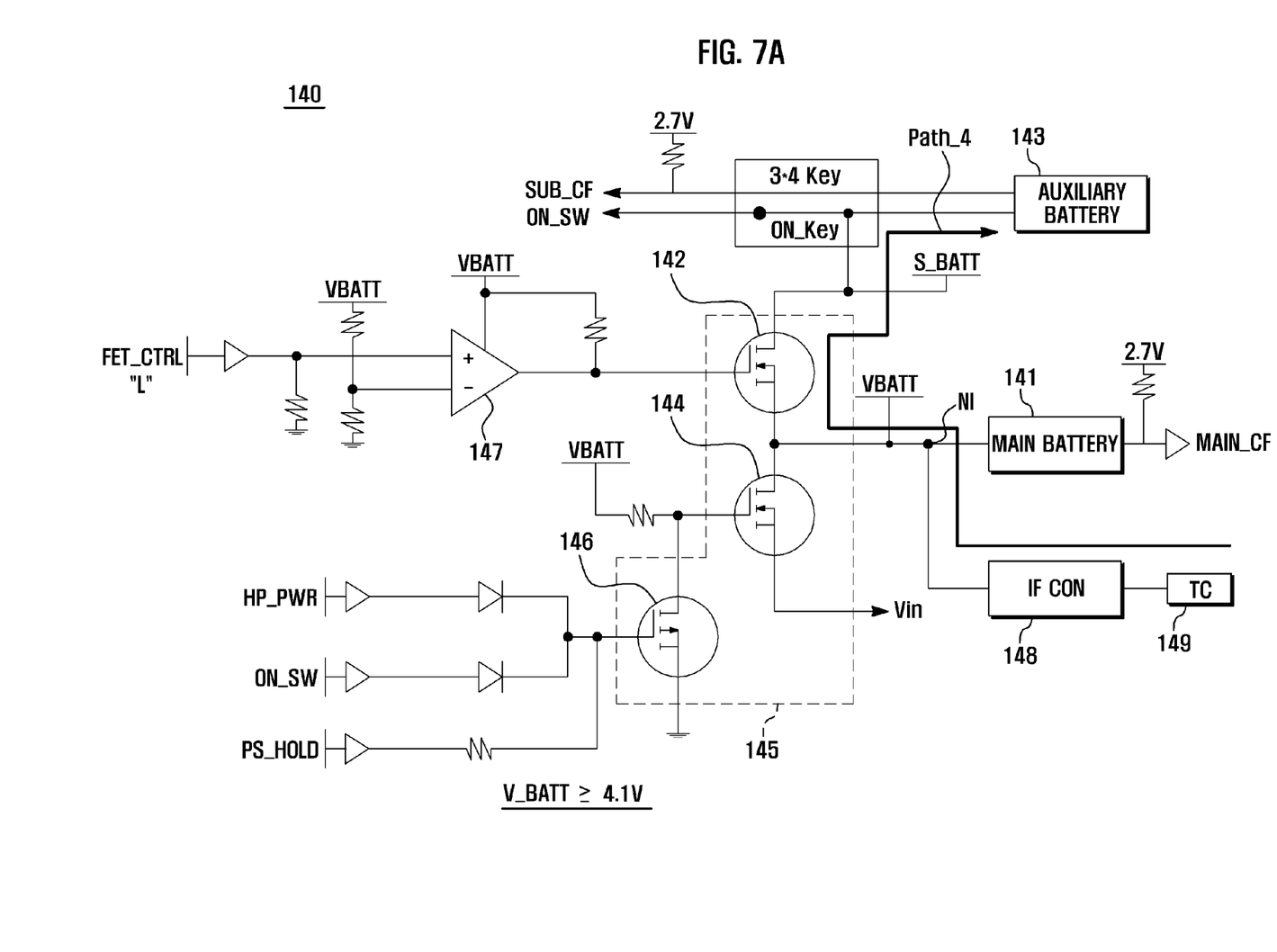
FIGS. 7A and 7B are circuit diagrams illustrating a flow of recharging voltage according to capacity of a main battery and an auxiliary battery when the main battery and the auxiliary battery are mounted, in accordance with an exemplary embodiment of the present invention.
Figure 7B:
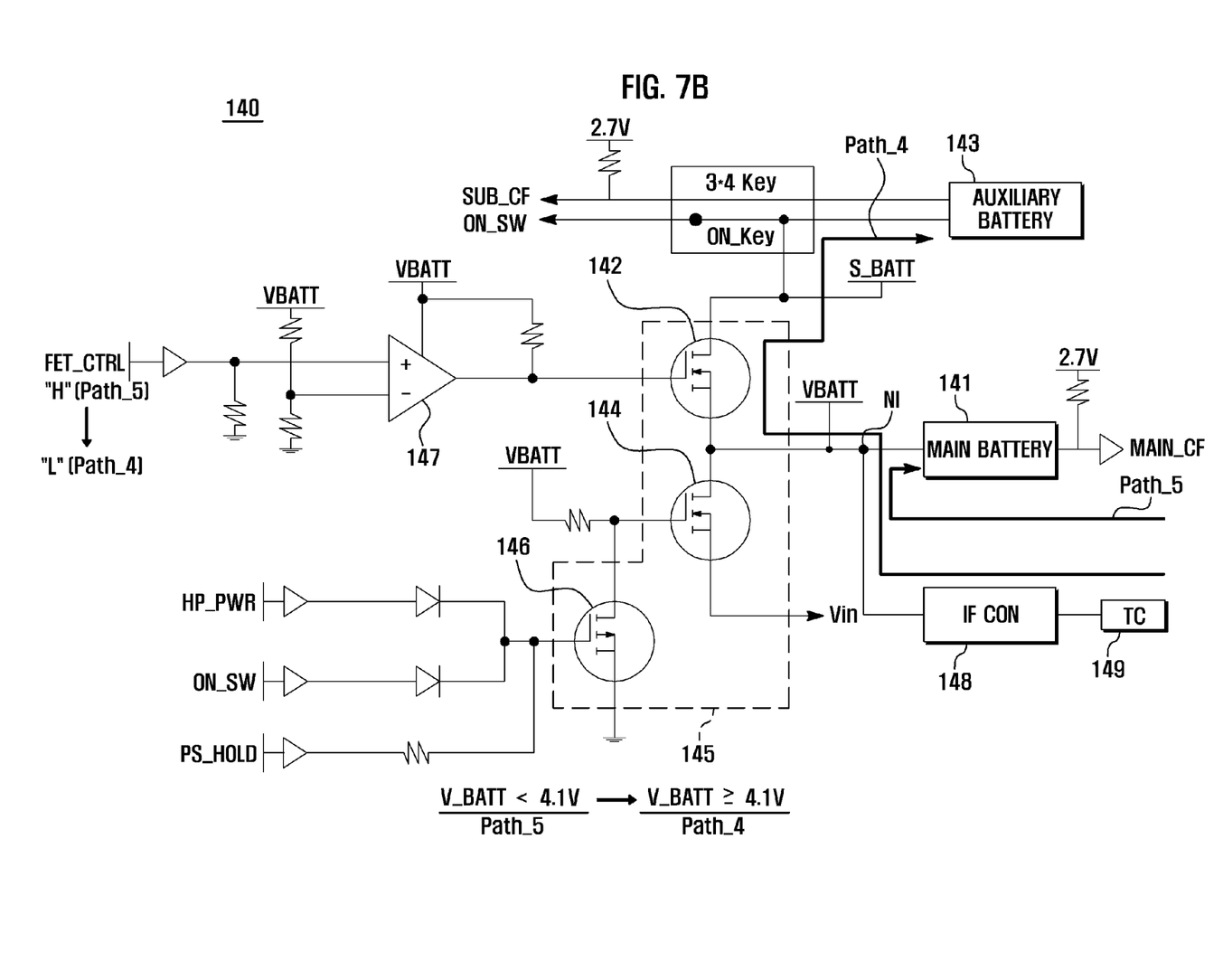

FIGS. 7A and 7B are circuit diagrams illustrating a power control circuit for recharging and a path formed when an auxiliary battery and a main battery are connected. In the illustrated example, a fully recharged status of the main battery 141 is a status where a voltage of the main battery 141 is equal to or greater than 4.1 V.

FIG. 7A is a circuit diagram illustrating a power control circuit for recharging and a path formed when the main battery is fully recharged with a voltage equal to or higher than 4.1 V.

Referring to FIG. 7A, when the main battery voltage VBATT is equal to or higher than a threshold voltage, for example 4.1 V, the controller 160 supplies the power control signal FET_CTRL as a "Low" signal to activate the first switch 142. By doing so, the power control circuit may include a fourth path Path_4 including the auxiliary battery 143, the first switch 142, the first node N1, the connector 148, and the TC 149. In this case, when the recharging voltage is supplied by the TC 149, the recharging voltage may recharge the auxiliary battery 143 along the fourth path Path_4.

FIG. 7B is a circuit diagram illustrating a power control circuit and a path for recharging the main battery 141 and the auxiliary battery 143 when the main battery is fully recharged with a voltage lower than 4.1 V.

Referring to FIG. 7B, when a voltage of the main battery 141 is lower than 4.1 V and the TC 149 is connected to supply the recharging voltage, the controller 160 supplies the recharging voltage to the main battery 141 to recharge the main battery 141. In this case, the controller 160 may transmit the voltage control signal FET_CTRL as a "High" signal to the comparator 147 to activate the first switch 142. In other words, the controller 160 first recharges the main battery 141 using a fifth path Path_5 ahead of recharging the auxiliary battery 143 and recharges the auxiliary battery 143 through the fourth path Path_4 as described above with reference to FIG. 7A such that the batteries are sequentially recharged.

Moreover, the controller 160 may transmit the power control signal FET_CTRL as a "Low" signal to the comparator 147 to activate the first switch 142. In other words, the controller 160 may form the fourth path Path_4 including the auxiliary battery 143, the first switch 142, the first node N1, the connector 148, and the TC 149 and the fifth path Path_5 including the main battery 141, the first node N1, the connector 148, and the TC 149, and may control the recharging voltage to recharge the main battery 141 and the auxiliary battery 143 through the fourth path Path_4 and the fifth path Path_5 simultaneously.

According to a power supply unit of an exemplary embodiment of the present invention, in a case when the main battery 141 and the auxiliary battery 143 are connected and the portable device 100 is turned off, when the auxiliary battery voltage S_BATT is higher than the main battery voltage VBATT, the auxiliary battery voltage S_BATT may recharge the main battery 141. In more detail, when the portable device 100 is turned off, the auxiliary battery voltage S_BATT is supplied to the drain terminal of the first switch 142 and an output of the comparator 147 is supplied to the gate terminal of the first switch 142. In this case, when the auxiliary battery voltage S_BATT is higher than the output of the comparator 147, as described above, an electric path is generated at the first switch 142 by parasitic current so that the auxiliary battery voltage S_BATT is supplied to the first node N1 through the first switch 142. After that, the auxiliary battery voltage S_BATT recharges the main battery 141 so that the auxiliary battery voltage S_BATT is the same as the main battery voltage VBATT.

When the main battery 141 has a voltage higher than that of the auxiliary battery 143, the first switch 142 maintains the inactivated status so that a path between the auxiliary battery 143 and the main battery 141 is blocked and the main battery voltage VBATT is prevented from reversely recharging the auxiliary battery 143.

The switches employed in the illustrated examples of the present invention have been described by a P-channel MOSFET inactivated when a high voltage is supplied and by an N-channel MOSFET inactivated when a low voltage is supplied, but are not limited thereto. In other words, the present invention may be modified or changed by a design so that the high voltage may be substituted by a low voltage and the low voltage may be substituted by a high voltage.

While exemplary embodiments of the present invention have been shown and described in this specification, it will be understood by those skilled in the art that various changes or modifications of the embodiments are possible without departing from the spirit and scope of the invention as defined by the appended claims and their equivalents.

What is claimed is:

1. A power control method of a portable device comprising a detachable main battery and a detachable auxiliary battery, the power control method comprising:
   determining whether the main battery is attached to the portable device and a voltage of the main battery if it is attached;
   determining whether the auxiliary battery is attached to the portable device and a voltage of the auxiliary battery if it is attached;
   forming one of a plurality of different power supply paths, each of the plurality of different supply paths corresponding to whether the batteries are attached, the magnitude of the main battery voltage and the magnitude of the auxiliary battery voltage; and
   outputting at least one of the main battery voltage, the auxiliary battery voltage, and an integrated voltage of the main battery voltage and the auxiliary battery voltage to an output unit,
   wherein, when the main battery and the auxiliary battery are attached to the portable device, the magnitude of the auxiliary battery voltage is equal to or greater than the main battery voltage, and the portable device is turned off;
   the forming of the power supply path comprises forming a path connecting the auxiliary battery to the main battery; and
   the outputting comprises outputting electric power such that the auxiliary battery voltage becomes the same as the main battery voltage using the path.

2. A power control method of a portable device comprising a plurality of batteries and a power control apparatus including a main battery and an auxiliary battery to be detached, the power control method comprising:
   when the main battery and the auxiliary battery are attached to the portable device, a magnitude of an auxiliary battery voltage becomes lower than a main battery voltage, and the portable device is turned off,
interrupting an electric path between the auxiliary battery voltage and the main battery voltage.

3. A power control apparatus to which a main battery and an auxiliary battery are detachably mounted, the power control apparatus comprising:
a switch for connecting the main battery to the auxiliary battery;
a comparator for outputting a power control signal to the switch to output at least one of a main battery voltage of the main battery and an auxiliary battery voltage of the auxiliary battery to the switch; and
an output unit for outputting at least one of the main battery voltage, the auxiliary battery voltage, and an integrated voltage from integrating the main battery voltage with the auxiliary battery voltage in accordance with the output from the comparator,
wherein, when the main battery and the auxiliary battery are attached, the auxiliary battery voltage is higher than the main battery voltage, and there is no voltage output, the auxiliary battery recharges the main battery.

4. The power control apparatus of claim 3, wherein, when the main battery and the auxiliary battery are attached, the auxiliary battery voltage is lower than the main battery voltage, and there is no voltage output, the main battery and the auxiliary battery are isolated from each other.

5. A portable device comprising:
a power supply unit, to which a main battery and an auxiliary battery are detachably mounted, for controlling a switch disposed between the main battery and the auxiliary battery to independently output a main battery voltage when the main battery voltage is higher than an auxiliary battery voltage, and to output an integrated voltage by integrating the main battery voltage with the auxiliary battery voltage when the main battery voltage is equal to or lower than the auxiliary battery voltage; and
a controller for supplying a power control signal for controlling the switch,
wherein the controller controls the auxiliary battery voltage to be supplied to the main battery when the auxiliary battery voltage is higher than the main battery voltage and the portable device is turned off.

6. The portable device of claim 5, wherein the controller isolates the auxiliary battery and the main battery from each other when the auxiliary battery voltage is lower than the main battery voltage and the portable device is turned off.

* * * * *